(12) United States Patent
Hayee (10) Patent No.: US 7,260,332 B1
(45) Date of Patent: Aug. 21, 2007

(54) ASYNCHRONOUS CHIRPED SYSTEMS, APPARATUSES, AND METHODS

(75) Inventor: M. Imran Hayee, Woodstock, MD (US)

(73) Assignee: Broadwing Corporation, Austin, TX (US)

( * ) Notice: Subject to any disclaimer, the term of this patent is extended or adjusted under 35 U.S.C. 154(b) by 273 days.

(21) Appl. No.: 10/912,694

(22) Filed: Aug. 5, 2004

Related U.S. Application Data

(60) Provisional application No. 60/492,520, filed on Aug. 5, 2003.

(51) Int. Cl.
*H04B 10/04* (2006.01)
(52) U.S. Cl. .................................. 398/185; 398/154
(58) Field of Classification Search ............... 398/183, 398/185, 188, 192
See application file for complete search history.

(56) References Cited

U.S. PATENT DOCUMENTS

| | | | |
|---|---|---|---|
| 5,526,162 A | | 6/1996 | Bergano |
| 5,999,292 A | * | 12/1999 | Dennis et al. ............... 398/101 |
| 2006/0018668 A1 | * | 1/2006 | Xu .............................. 398/188 |

* cited by examiner

*Primary Examiner*—Leslie Pascal (57) ABSTRACT

An optical asynchronous chirp device having an input port and an output port, comprising first and second optical phase modulators optically connected in series between the input port and the output port of the device, a local oscillator connected to the first and second phase modulators, and a phase shifter connected between the local oscillator and one of the phase modulators, and systems and methods related thereto.

19 Claims, 8 Drawing Sheets

ASYNCHRONOUS CHIRPED SYSTEMS, APPARATUSES, AND METHODS

CROSS-REFERENCE TO RELATED APPLICATIONS

This application claims priority from U.S. Provisional Patent Application No. 60/492,520, filed Aug. 5, 2003, which is incorporated herein by reference.

STATEMENT REGARDING FEDERALLY SPONSORED RESEARCH AND DEVELOPMENT

Not Applicable.

BACKGROUND OF THE INVENTION

It is known in the field of optical communications to utilize "chirp" to compensate for effects such as non-linearities. Chirping causes a signal's spectrum to spread and, therefore, reduces the power density. As a result, non-linear effects are also reduced. Chirping can also be used, for example, to compensate for dispersion caused when optical signals travel through optical fiber, as well as to compensate for other effects.

On prior art method is to use a fixed chirp which is inherent in a Mach-Zehnder-based ("MZ"-based) intensity modulator. Another prior art method is to use a separate phase modulator ("PM") to implement chirp through phase modulation of the signal. The prior art, however, requires the PM to be synchronous. This is accomplished by driving the PM with the same clock source as drives the data modulator(s).

Figure 1:
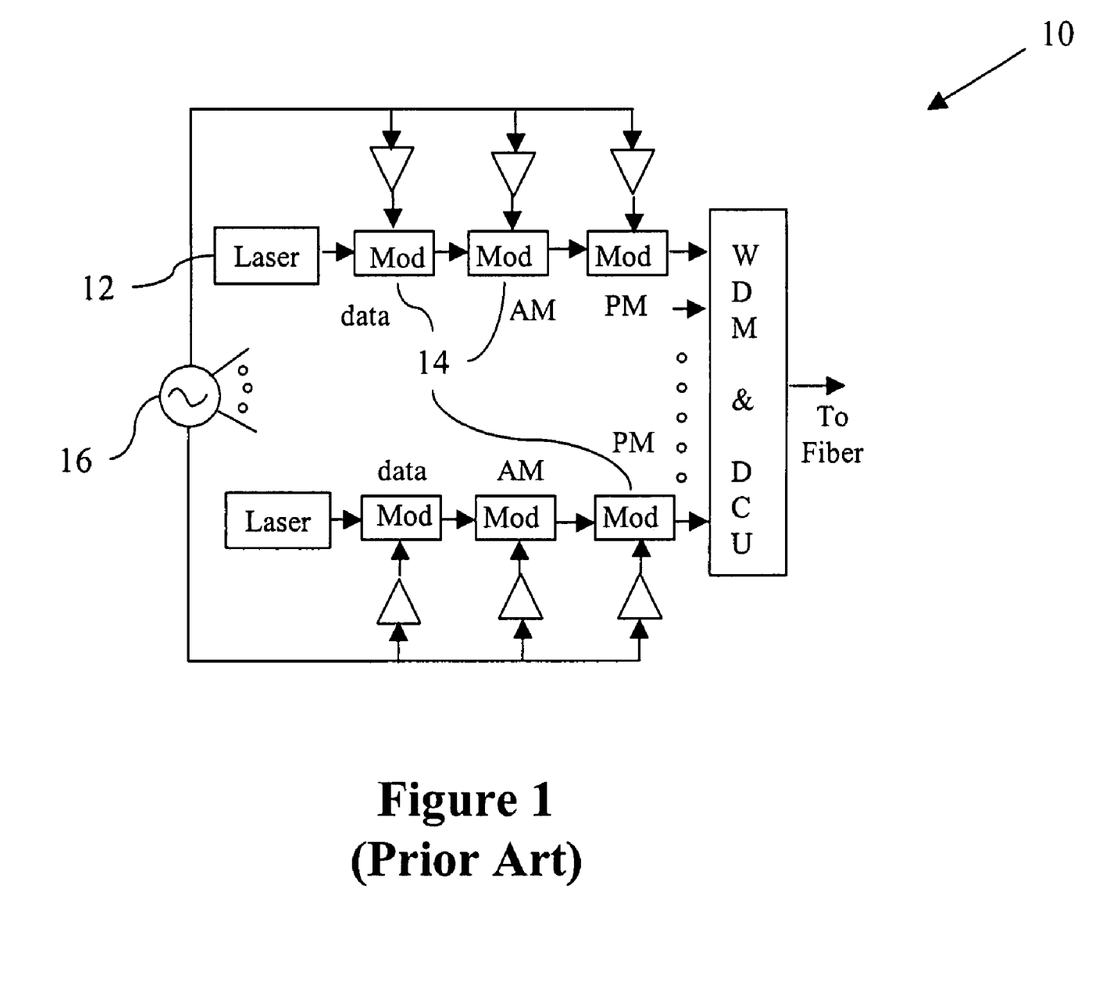
FIG. 1 illustrates one embodiment of a prior art implementation of a chirped wavelength division multiplexed optical communications transmitter.

FIG. 1 illustrates one embodiment of a prior art implementation of a chirped wavelength division multiplexed optical communications transmitter 10. In that embodiment, a laser 12 and several modulators 14 are used to produce an optical signal for one of the wavelength division multiplexed channels. In this particular embodiment, the laser 12 produces an optical carrier, one modulator is used to modulate data onto an optical carrier in non-return to zero ("NRZ") format, another modulator is used to amplitude modulate ("AM") the NRZ format signal to produce a return to zero ("RZ") format, and a third modulator is used to phase modulate ("PM") the RZ format signal. The phase modulator introduces the chirp to the signal.

Each of the modulators 14 in the illustrated prior art embodiment are driven by a common or master clock signal generated by a master clock or oscillator 16 so that the operation of each of the modulators 14 is precisely synchronized. The synchronization of the modulators 14 is necessary in the prior art because the degree of chirp introduced by the phase modulator is a function of the relative phase between the data and the clock signals. This dependence on phase can be seen more clearly with reference to data points "1 mod" in FIG. 6, which is described in more detail hereinbelow. As a result, if the phase modulators of the prior art are not synchronized with the other modulators, the extent of the chirp cannot be controlled and the performance of the system will suffer. U.S. Pat. No. 5,526,162, issued to Bergano, illustrates the prior art approach in which a master clock is used to precisely synchronize various modulators in an optical transmission system.

For example, if a local oscillator is used to drive the phase modulator, it may be unsynchronized, resulting in the chirp of the optical signal to vary over time. This can cause significant detrimental effects because the variation in chirp can vary significantly.

The use of synchronous chirp has certain disadvantages. For example, an optical transmitter which is initially designed to operate without chirp, cannot be easily or inexpensively upgraded to introduce chirp. That is because it is difficult and expensive to upgrade a produce with a synchronous phase modulator. As a result, using synchronous chirp according to the prior art limits the ability to modify products in light of new or changing business environments.

Therefore, there is a need for systems, apparatuses, and methods which allow for signals to be chirped without the requirements and limitations of the prior art.

BRIEF SUMMARY OF THE INVENTION

The present invention is directed to systems, apparatuses, and methods for producing and utilizing chirped signals and, more particularly, for systems, apparatuses, and methods for producing and utilizing asynchronous chirped signals.

In one embodiment of the present invention, chirped optical signals are produced using an asynchronous chirp module. The chirp module may utilize a local oscillator, two or more optical phase modulators, and an electrical phase shifter. The local clock drives the phase modulators such that the two driving signals are ninety (90) degrees out of phase due to the phase shifter. As a result, the dependence of the phase modulation produced by the chirp module will be modified. The particular manner in which it is modified will depend on factors such as the characteristics of the phase modulators and the amount of phase shift introduced.

The chirp module may be utilized, for example, in a transmitter and may be used with or without wavelength division multiplexing. In wavelength division multiplexed applications, the chirp module may be upstream or downstream of the wavelength division multiplexer. The present invention may be embodied as a discrete module which may be added to a pre-existing apparatus, or it may be integrated into an apparatus without any modularity.

Unlike synchronous chirp designs, the asynchronous nature of the present invention allows it to be more easily used to upgrade devices which were not originally designed to utilize chirp. For example, the present invention may be used to upgrade pre-existing communications systems and apparatuses from unchirped systems and apparatuses to chirped systems and apparatuses. This is particularly valuable in undersea systems in which the submerged portions are not easily modified or upgraded, although it is also valuable for terrestrial systems. The present invention is also particularly useful for new system builds which must utilize existing equipment.

Those and other embodiments and advantages of the present invention will be described in more detail hereinbelow.

BRIEF DESCRIPTION OF THE SEVERAL VIEWS OF THE DRAWINGS

Embodiments of the present invention will now be described, by way of example only, with reference to the accompanying drawings, wherein.

DETAILED DESCRIPTION OF THE INVENTION

The present invention will be described in terms of optical, wavelength division multiplexed communications systems, although the present invention has broader applicability. For example, the present invention may be used without wavelength division multiplexing. Furthermore, the particular types of signal generation and modulation techniques and formats may also be varied according to the teachings of the present invention.

Figure 2:
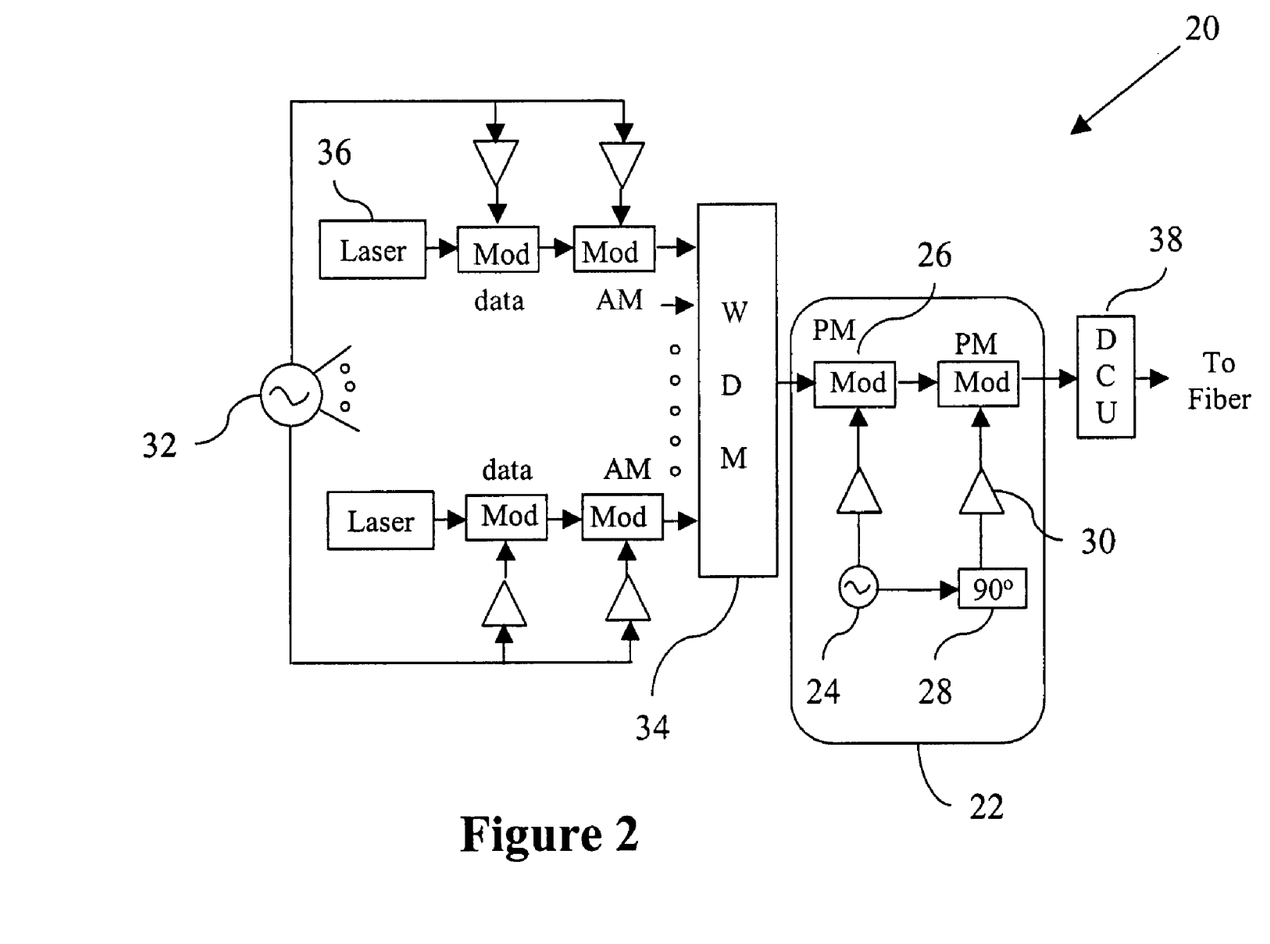
FIGS. 2 and 3 illustrate several embodiments of optical communications transmitters according to the present invention.

FIG. 2 illustrates one embodiment of a wavelength division multiplexed optical communications transmitter 20 according to the present invention. In that embodiment, chirped optical signals are produced using an asynchronous chirp module 22. The chirp module 22 in the illustrated embodiment utilizes a local oscillator 24, two phase modulators 26, and a ninety degree phase shifter 28. The local oscillator 24 drives the two phase modulators 26 and the phase shifter 28 between the local oscillator 24 and one of the phase modulators 26 causes the phase modulators 26 to produce different relative phase modulations of the optical signals. As a result, the dependence of the phase modulation produced by the chirp module 22 will be modified. The particular manner in which it is modified will depend on factors such as the characteristics of the phase modulators 26 and the amount of phase shift introduced. The combination of optical phase modulators 26 and a phase shifter 28 according to the present invention allows for better control of phase modulation or chirp over a range of relative phase angles such as, for example, to provide a relatively constant chirp over a wide range of relative phase angles.

Although the phase shifter 28 is illustrated as a ninety degree phase shifter, it may provide more or less than ninety degrees of shift. For example, the particular embodiment of the phase modulators 26 may dictate a different phase shift in order to achieve desired performance. Furthermore, the particular application may require some other phase shift in order to achieve the desired results. For example, the phase shifter 28 may produce forty-five degrees of shift, sixty degrees of shift, or some other value. Furthermore, the phase shifter 28 may be variable so that, for example, it may be tuned or adjusted for better performance, such as to compensate for performance changes over time. In other embodiments, the phase shifter 28 may be varied more regularly, such as to improve averaging of, or otherwise control, the chirp over the range of relative phase angles. In other embodiments, more than one phase shifter 28 may be used. For example, two or more phase shifters 28 may be used, along with additional phase modulators 26, to further refine the dependence of chirp on the relative phase angle of the data and clock signals.

The local oscillator 24 may operate at the same frequency as the master oscillator 30 used to drive the other modulators, or it may operate at a different frequency. One advantage of using a local oscillator 24 having a different frequency is that phase dependent variations in phase modulation will be constantly changing, thereby providing a better averaging effect which is desirable for some applications. In other embodiments, more than one local oscillator 24 with different frequencies may be used to provide signals which sweep across each other.

The chirp module 22 is illustrated as including one local oscillator 24, a ninety degree phase shifter 28, and two phase modulators 26. However, many variations of the chirp module 22 are possible. For example, the chirp module 22 may contain more than two phase modulators 26 and more than one phase shifters. Furthermore, the phase shifter may be more or less than ninety degrees. Also, the phase modulator 26 utilizing the phase shifter 28 is illustrated as being the second modulator, although it may instead be used as the first modulator. Furthermore, one or more parts may be variable, such as to allow for better control. The drivers 30, for example, may be fixed or variable or, in some embodiments, may be eliminated.

In the illustrated embodiment, the chirp module 22 is polarization sensitive and is illustrated downstream of the wavelength division multiplexer ("WDM") 34. As a result, polarization maintaining fiber and devices are used between the optical sources, such as lasers 36, and the PM modulators 26. The use of polarization maintaining fiber and devices is sometimes undesirable and expensive, particularly in a WDM 34, and it will sometimes be desirable to locate the chirp module 22 upstream of the WDM 34 to reduce the use of polarization maintaining fiber and devices. Furthermore, a dispersion compensation unit ("DCU") 38 is provided after the PM modulators 26 in this embodiment, because the DCU 38 disturbs the polarity of the data signals. In other embodiments, such as those which can PM modulate with polarization insensitive modulators 26, or with DCUs 38 which do not disturb the polarity of the data signal, different configurations may be used. As illustrated in FIG. 2, the chirp module 22 has an input port connected to the output of the wavelength division multiplexer 34 and an output port connected to the dispersion compensation unit 38. As described below, the chirp module 22 may be connected in other configurations and the input and output ports may be connected to other devices.

Figure 3:
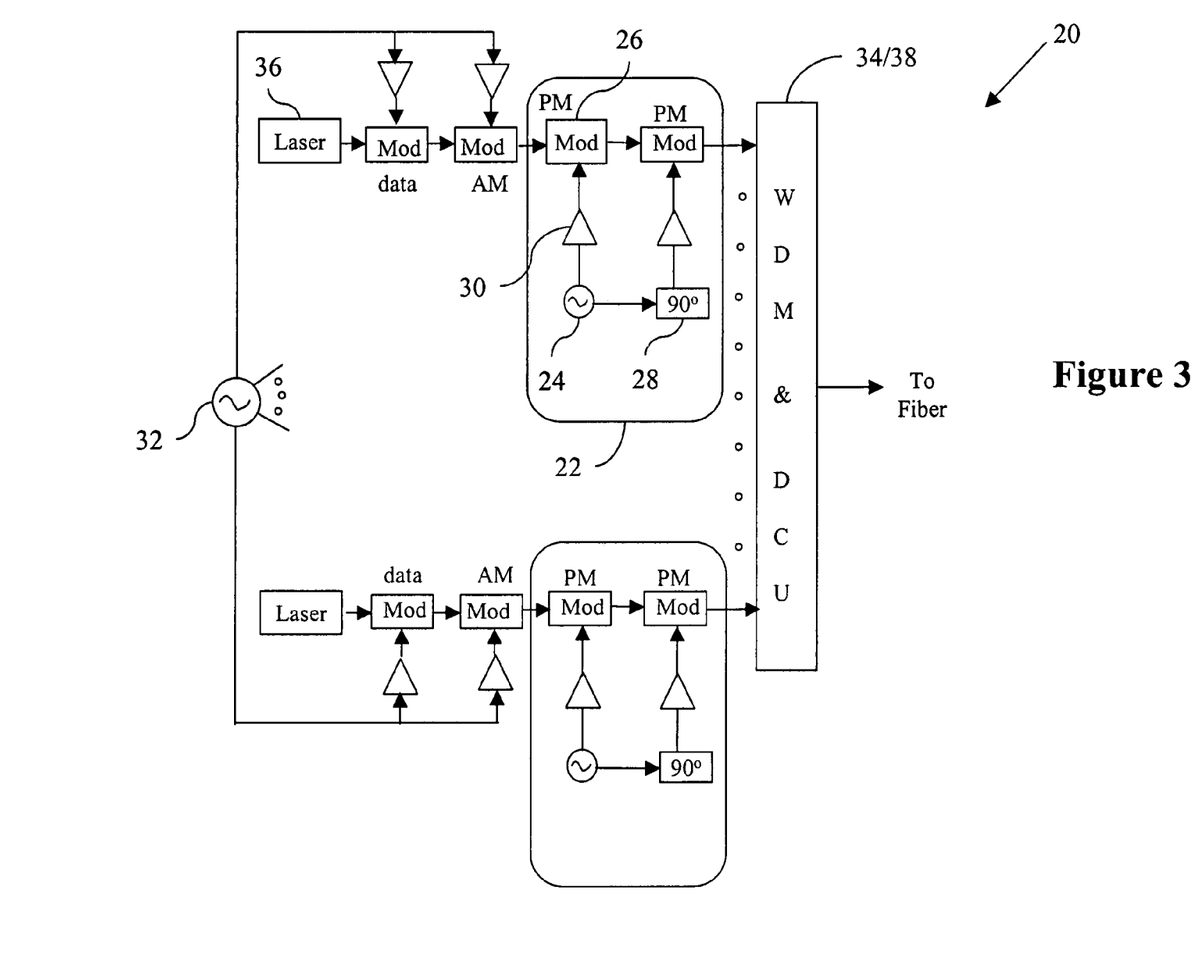

FIG. 3 illustrates another embodiment of an optical communications transmitters 20 according to the present invention. In this embodiment, the chirp module 22 is located upstream of the WDM 34 and can eliminate the need to utilize polarization maintaining fiber and devices through the WDM 34, although more chirp modules 22 are used. This embodiment also illustrates a DCU 38 in the WDM 34.

Figure 4:
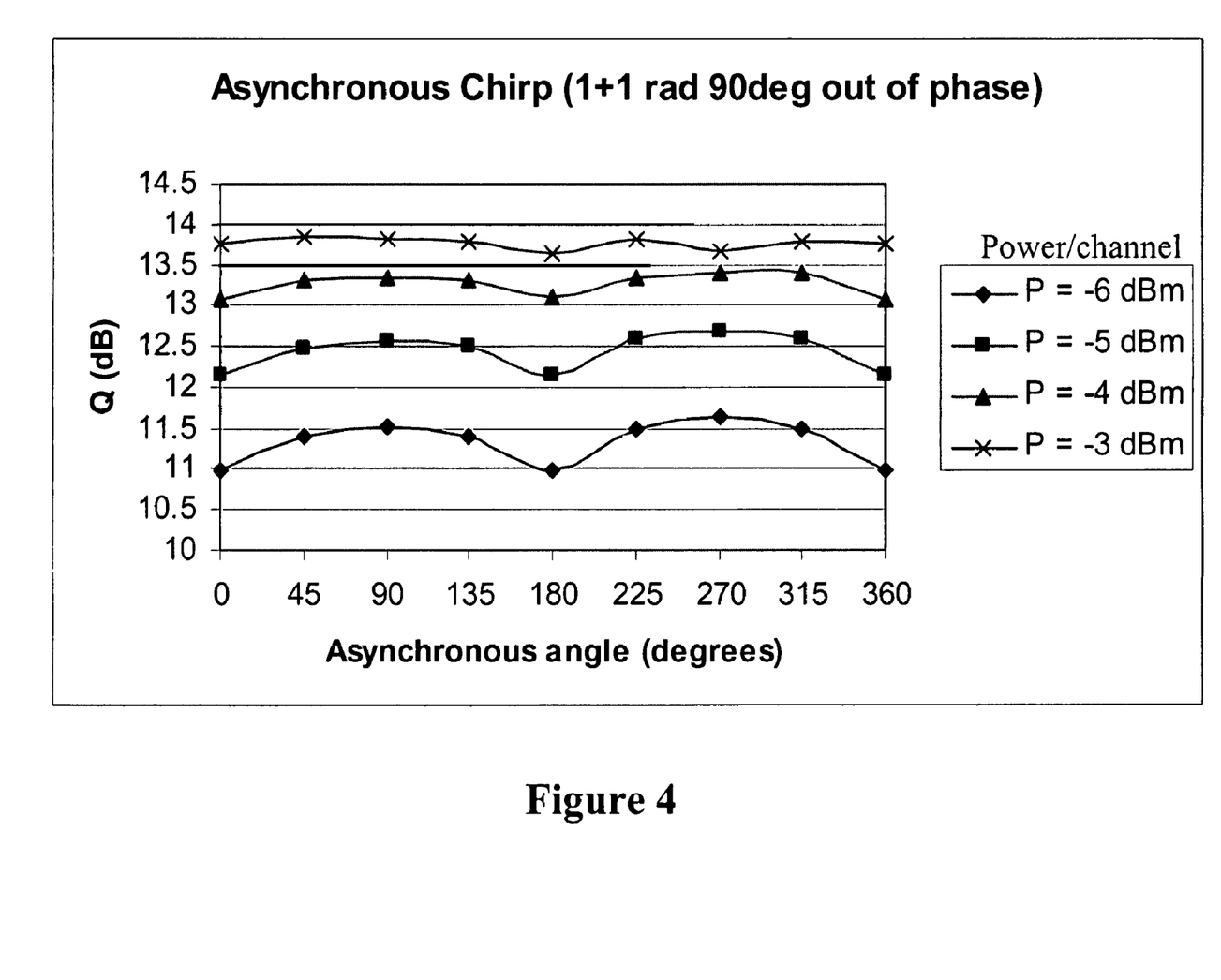
FIG. 4 is a graph illustrating performance of one embodiment of the present invention at different power/channel settings.

FIG. 4 is a graph illustrating performance of one embodiment of the present invention at different power/channel settings. This graph was produced with simulated data over a 12,000 kilometer system utilizing carrier-suppressed RZ format optical signals according to the present invention. The graph illustrates the present invention producing predictable performance over a range of launch powers.

Figure 5:
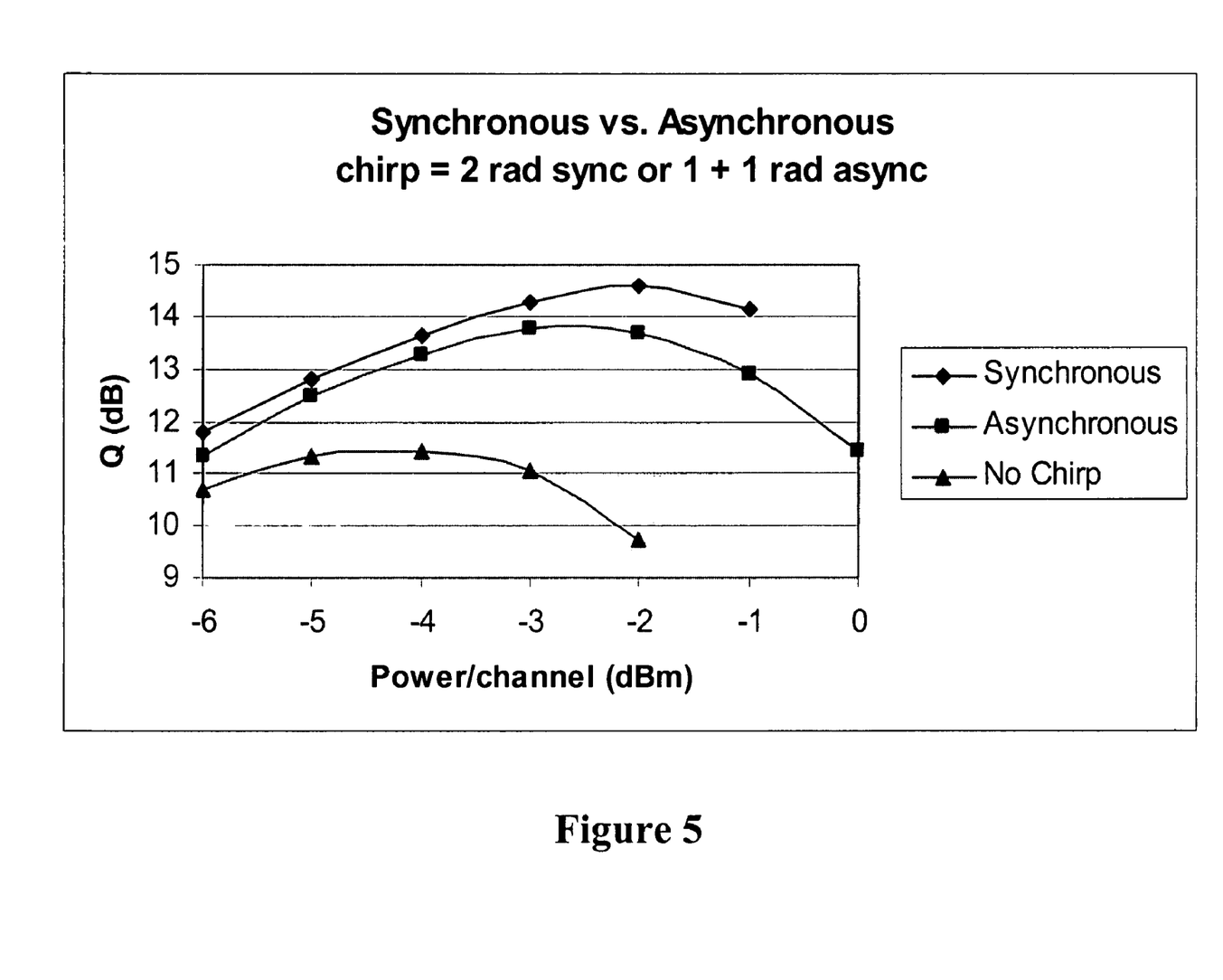
FIG. 5 is a graph illustrating synchronous chirped, asynchronous chirped, and non-chirped performance.

FIG. 5 is a graph illustrating synchronous chirped, asynchronous chirped, and non-chirped performance over various signal launch powers. This graph was produced with simulated data over a 12,000 kilometer system utilizing carrier-suppressed RZ format optical signals according to the present invention. The present invention produced performance comparable to that of a comparable synchronous chirped system, and produced significantly better performance than an unchirped system.

Figure 6:
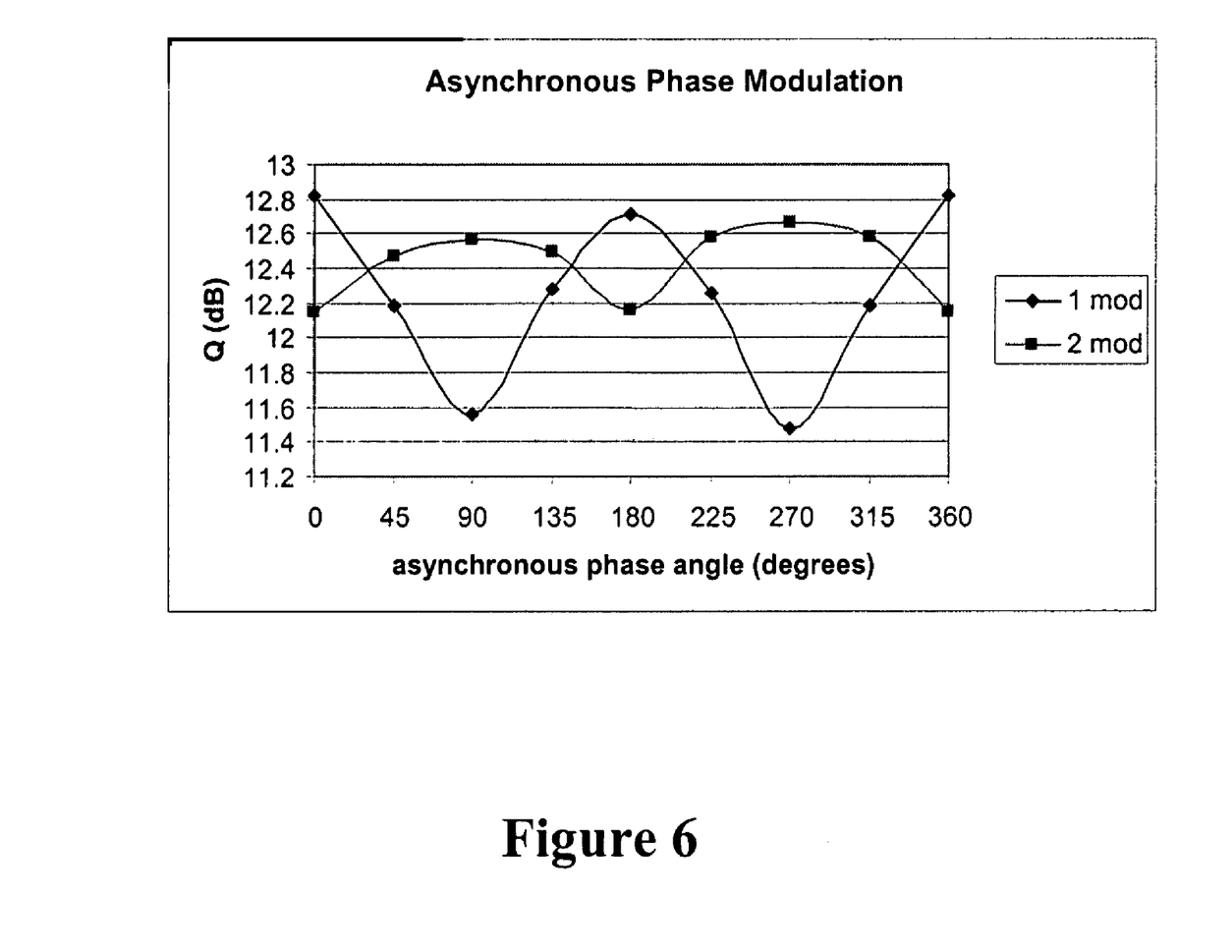
FIG. 6 is a graph illustrating synchronous chirped and asynchronous chirped performance through 360 degrees of phase angle.

FIG. 6 is a graph illustrating one example of synchronous chirped and asychronous chirped performance through 360 degrees of relative phase angle between the data and driver signals. The prior art synchronous chirped curve (identified as "1 mod") exhibits significant peak to peak variation. As a result, without synchronization, the prior art will produce significant performance variations which can be undesirable. In contrast, the asynchronous chirped curve (identified "2 mod") exhibits less peak to peak variation, thereby providing for more predictable phase modulation without the need for synchronization.

Figure 7:
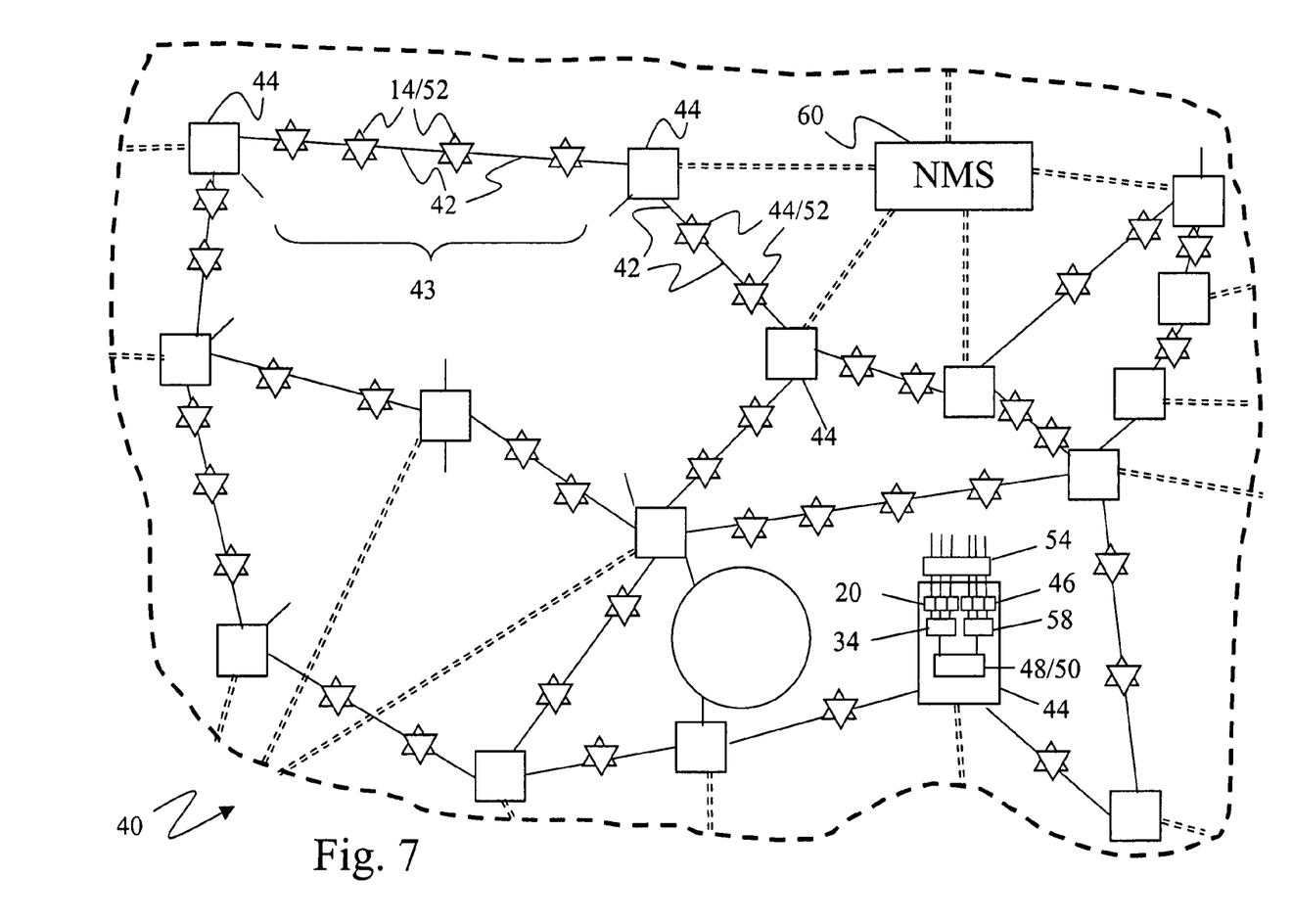
FIGS. 7 and 8 illustrate embodiments of systems in which the present invention may be implemented.

The present invention also includes systems utilizing the teachings of the present invention. For example, a system may transmit data in chirped form by including one or more transmitters 20 which produce asynchronously chirped signals according to the present invention. FIG. 7 illustrates one embodiment of an optical communications system 40 which includes optical paths 42 forming links 43 and connecting nodes and network elements 44, which may include, for example, transmitters 20, receivers 46, switches 48, add/drop multiplexers 50, amplifiers 52, interfacial devices 54, multiplexers/combiners 34, and demultiplexers/distributors 58, as well as filters, dispersion compensating and shifting devices, monitors, couplers, splitters, and other devices. One embodiment of one node 44 is illustrated in FIG. 7, although the nodes 44 can have many other variations and embodiments.

Advantages of the present invention can be realized with many system 40 configurations and architectures, such as an all optical network, one or more point to point links, one or more rings, a mesh, other architectures, or combinations of architectures. The system 40 illustrated in FIG. 7 is a multi-dimensional network, which can be implemented, for example, as an all optical mesh network, as a collection of point to point links, or as a combination of architectures. The system 40 can employ various signal formats, and can also convert between formats. The system 40 can also include more or less features than those illustrated herein, such as by including or deleting a network management system ("NMS") 60 and changing the number, location, content, configuration, and connection of nodes 44.

Figure 8:
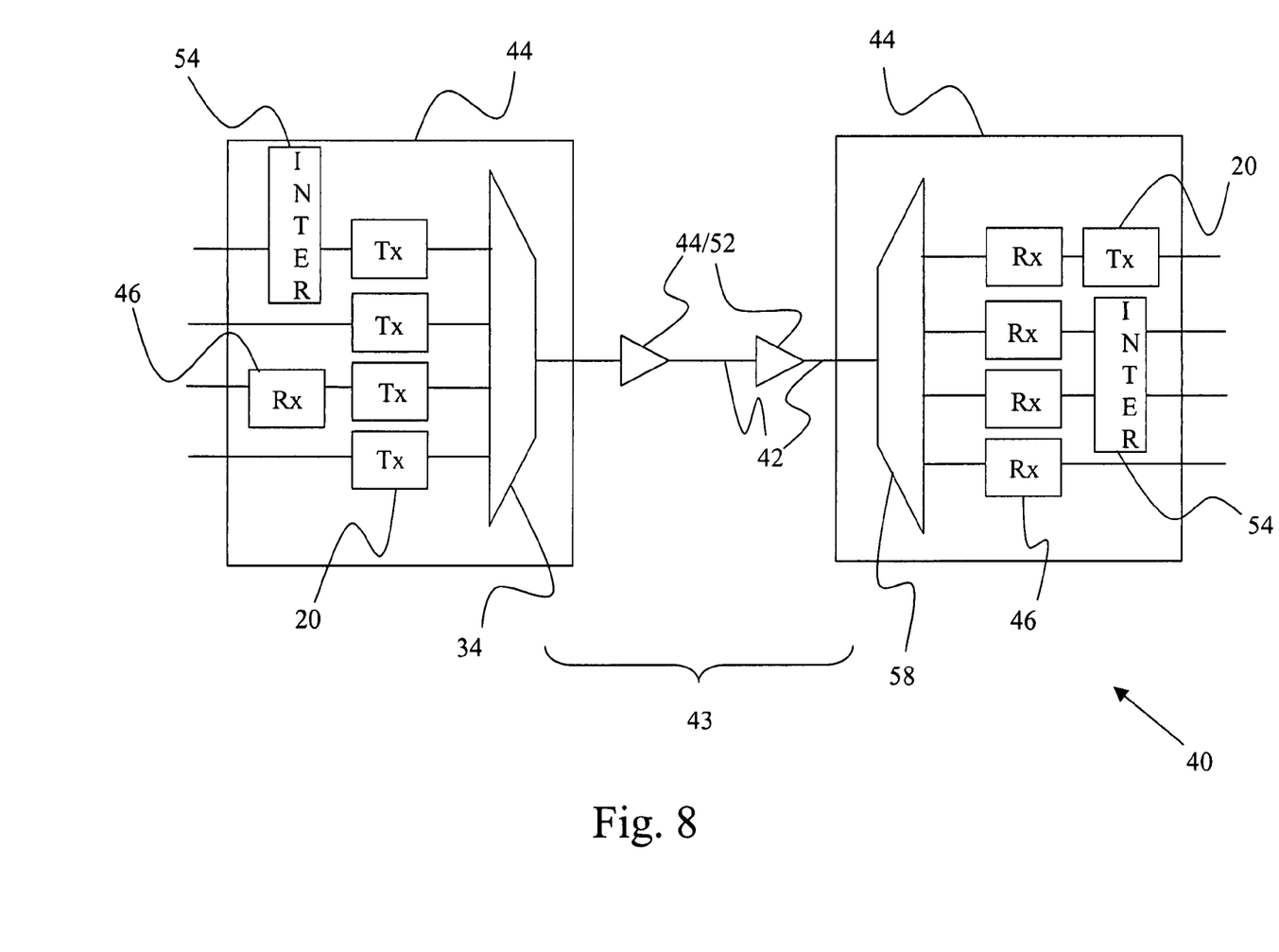

FIG. 8 illustrates another embodiment of the system 10 including a link 43 of four nodes and network elements 44. That link 43 can be, for example, all or part of a point to point system, or it may be part of a multi-dimensional, mesh, or other system. One or more of the nodes or network elements 44 can be connected directly to the network management system 60 (not shown). If the link 43 is part of a larger system, then as few as none of the nodes or network elements 44 can be connected to the network management system 60 and all of the nodes and network elements 44 can still be indirectly connected to the NMS 60 via another node or network element 44 in the larger system 40.

Many variations and modifications can be made to described embodiments of the invention without departing from the scope of the invention. For example, transmitters are illustrated as utilizing data modulators and amplitude modulators, while the present invention may be utilized with a single modulator, with more than two modulators, with different modulators, or with no external modulators at all. Other variations, modifications, and combinations are taught and suggested by the present invention, and it is intended that the foregoing specification and the following claims cover such variations, modifications, and combinations.

The invention claimed is:

1. An optical asynchronous chirp device, comprising:
   an input port and an output port, wherein the input port is for receiving an optical signal onto which data has been modulated in response to a master oscillator;
   first and second optical phase modulators optically connected in series between the input port and the output port of the device;
   a local oscillator connected to the first and second phase modulators, wherein the local oscillator is not synchronized with the master oscillator; and
   a phase shifter connected between the local oscillator and one of the phase modulators.

2. The device of claim 1, wherein the phase shifter induces a phase shift in signals passing through the phase shifter, and wherein the phase shift induced in signals passing through the phase shifter is variable.

3. The device of claim 2, further comprising:
   at least one additional optical phase modulator optically connected in series with the first and second optical phase modulators;
   at least one additional phase shifter, wherein the additional phase shifter induces a phase shift in signals passing through the phase shifter, and wherein the phase shift induced by the at least one additional phase shifter is different than the phase shift induced by the phase shifter; and
   wherein the local oscillator is connected to each of the at least one additional phase modulators via the at least one additional phase shifters.

4. An optical transmission system, comprising:
   at least one transmitter including:
      an optical source;
      a master oscillator;
      at least one modulator in series with the optical source and responsive to the master oscillator;
      an asynchronous chirp device connected in series with the optical source and including:
         a local oscillator which is asynchronous with the master oscillator;
         first and second optical phase modulators connected in series with each other, connected in series with the optical source, and responsive to the local oscillator; and
         a phase shifter connected between the local oscillator and one of the phase modulators;
   at least one receiver; and
   at least one optical path connecting the at least one transmitter to the at least one receiver.

5. The system of claim 4, further comprising:
   a plurality of transmitters, each including:
      an optical source;
      a master oscillator;
      at least one modulator in series with the optical source and responsive to the master oscillator;
   a wavelength division multiplexer having a plurality of inputs and an output, wherein the inputs of the wavelength division multiplexer are connected to the plurality of transmitters;
   at least one asynchronous chirp device connected in series with the transmitters and including:
      a local oscillator which is asynchronous with the master oscillators;
      first and second optical phase modulators connected in series with each other, connected in series with the transmitters, and responsive to the local oscillator; and a phase shifter connected between the local oscillator and one of the phase modulators;
a plurality of receivers; and
at least one optical path connecting the plurality of transmitters to the plurality of receivers.

6. The system of claim 5, further including a plurality of asynchronous chirp devices connected in series with the transmitters, each asynchronous chirp device including:
a local oscillator which is asynchronous with the master oscillators;
first and second optical phase modulators connected in series with each other, connected in series with one of the transmitters, and responsive to the local oscillator; and
a phase shifter connected between the local oscillator and one of the phase modulators;
wherein the plurality of asynchronous chirp devices are connected between the plurality of receivers and the wavelength division multiplexer.

7. The system of claim 4, wherein the transmitter further includes:
a plurality of optical sources;
a plurality of modulators in series with the optical sources and responsive to the master oscillator;
a wavelength division multiplexer having a plurality of inputs and an output, wherein the inputs of the wavelength division multiplexer are connected to the plurality of optical sources.

8. The system of claim 7, wherein the wavelength division multiplexer is connected between the optical sources and the asynchronous chirp device.

9. The system of claim 8, further comprising a dispersion compensation unit connected in series after the asynchronous chirp device.

10. The system of claim 7, wherein:
the transmitter further includes a plurality of asynchronous chirp devices connected in series with the plurality of optical sources, wherein each of the plurality of asynchronous chirp devices includes:
a local oscillator which is asynchronous with the master oscillator;
first and second optical phase modulators connected in series with the optical source and responsive to the local oscillator; and
a phase shifter connected between the local oscillator and one of the phase modulators; and
the asychronous chirp devices are connected between the optical sources and the wavelength division multiplexer.

11. The system of claim 10, wherein at least one of the asychronous chirp devices further includes:
at least one additional local oscillator which is asynchronous with the master oscillator;
at least a third optical phase modulator connected in series with the first and second optical phase modulators, connected in series with the optical source, and responsive to the at least one additional local oscillator; and
at least one additional phase shifter connected between the at least one additional local oscillator and the at least a third optical phase modulator.

12. The system of claim 11, wherein:
the local oscillator has an frequency; and
the at least one additional local oscillator has a frequency, wherein the frequency of the local oscillator is different than the frequency of the at least one additional local oscillator.

13. The system of claim 4, wherein:
the master oscillator has a frequency; and
the local oscillator has a frequency, wherein the frequency of the local oscillator is different than the frequency of the master oscillator.

14. A method of producing chirping an optical signal, comprising:
producing a master clock signal;
modulating data onto an optical carrier in response to the master clock signal to produce the optical signal,
producing a local clock signal that is not synchronized with the master clock signal;
phase shifting the local clock signal to produce a phase shifted local clock signal;
phase modulating the optical signal in response to the local clock signal;
phase modulating the optical signal in response to the phase shifted local clock signal.

15. The method of claim 14, wherein phase modulating the optical signal in response to the local clock signal is performed after phase modulating the optical signal in response to the phase shifted local clock signal.

16. The method of claim 14, wherein phase modulating the optical signal in response to the local clock signal and phase modulating the optical signal in response to the phase shifted local clock signal includes producing different relative phase modulations of the optical signal.

17. The method of claim 16, wherein phase shifting the local clock signal includes varying a phase shift applied to the local clock signal.

18. The method of claim 14, wherein producing a local clock signal includes producing a local clock signal which has a frequency that is different than a clock signal frequency used in producing the optical signal.

19. The method of claim 14, wherein:
the master clock signal has a frequency; and
and the local clock signal has a frequency, wherein the frequency of the master clock signal is different from the frequency of the local clock signal.

* * * * *